(12) United States Patent
Chen et al.

(10) Patent No.: US 8,477,921 B2
(45) Date of Patent: Jul. 2, 2013

(54) MANAGING PARTICIPATION IN A TELECONFERENCE BY MONITORING FOR USE OF AN UNRELATED TERM USED BY A PARTICIPANT

(75) Inventors: Feng-Wei Chen, Cary, NC (US); Ying Chen, Raleigh, NC (US); Dinah H. Lin, Cary, NC (US); Latha Sivakumar, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 364 days.

(21) Appl. No.: 12/827,826

(22) Filed: Jun. 30, 2010

(65) Prior Publication Data

US 2012/0002798 A1 Jan. 5, 2012

(51) Int. Cl.
*H04M 3/42* (2006.01)

(52) U.S. Cl.
USPC .............. 379/202.01; 379/93.21; 370/261

(58) Field of Classification Search
USPC 379/93.21, 202.01, 203.01, 204.01; 455/416; 370/260, 261, 262, 265
See application file for complete search history.

(56) References Cited

U.S. PATENT DOCUMENTS

| 5,801,756 | A | 9/1998 | Iizawa |
| 6,963,353 | B1 | 11/2005 | Firestone |
| 7,180,535 | B2 | 2/2007 | Ahonen |
| 2005/0272415 | A1* | 12/2005 | McConnell et al. .......... 455/418 |
| 2006/0023061 | A1* | 2/2006 | Vaszary et al. ............. 348/14.08 |
| 2007/0285505 | A1 | 12/2007 | Korneliussen |
| 2008/0320082 | A1 | 12/2008 | Kuhlke et al. |
| 2009/0063991 | A1 | 3/2009 | Baron et al. |
| 2010/0153832 | A1* | 6/2010 | Markus et al. ................ 715/205 |

FOREIGN PATENT DOCUMENTS

| JP | 2006323738 | 11/2006 |
| JP | 2009098740 | 5/2009 |

OTHER PUBLICATIONS

S. Sellers et al., "Reaching All Students: A Resource for Teaching in Science, Technology, Engineering & Mathematics, 2nd Edition", Center Document Service, Wisconsin Center for Education Research, Madison, WI, 2007.

* cited by examiner

*Primary Examiner* — Antim Shah
(74) *Attorney, Agent, or Firm* — Law Office of Jim Boice

(57) ABSTRACT

A computer implemented method manages participation in a teleconference. Teleconference inputs from participants of a teleconference are monitored for use of an unrelated term, which is a term that has been deemed unrelated to a topic of the teleconference. Upon determining that an errant participant is using the unrelated term in at least one of the teleconference inputs, an alert is generated to prompt the errant participant to limit future teleconference inputs to the topic of the teleconference.

19 Claims, 5 Drawing Sheets

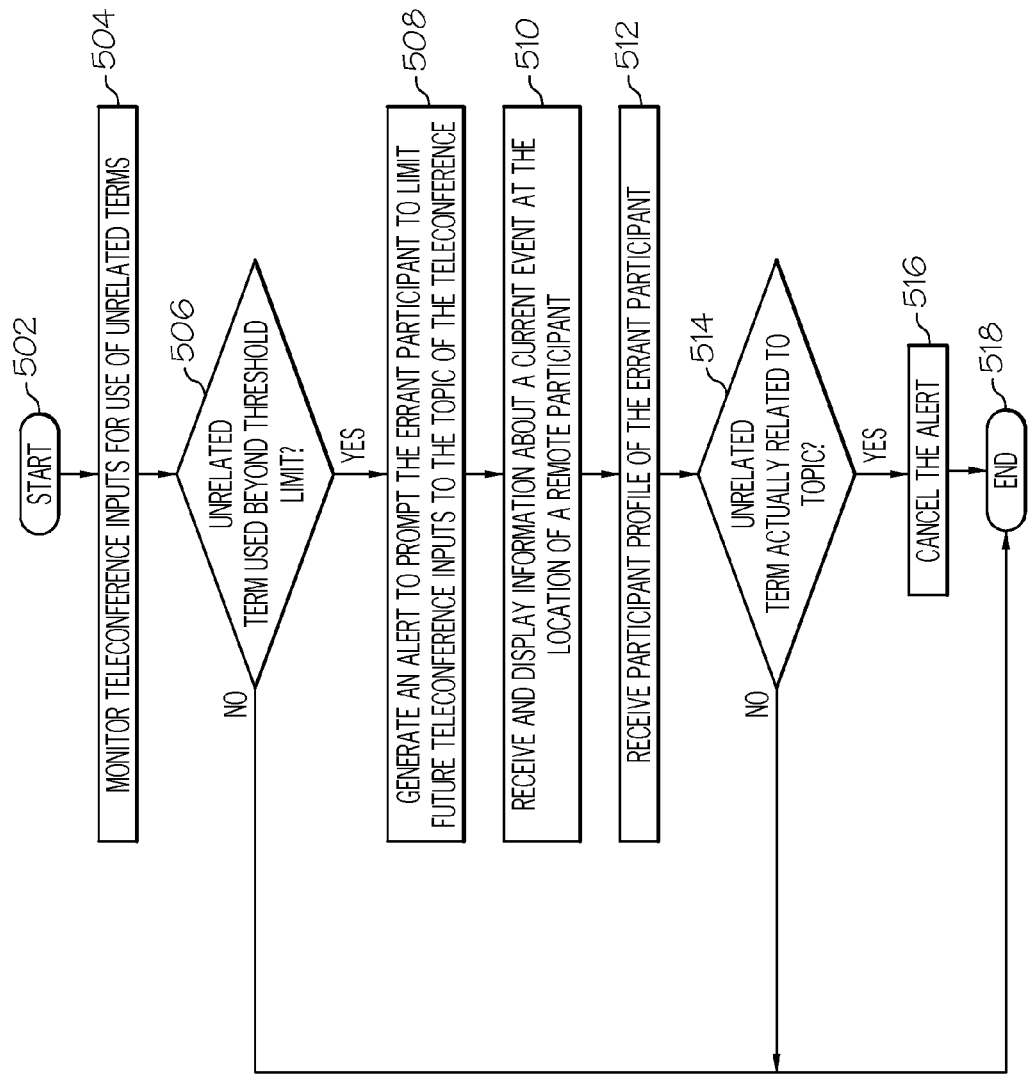

US 8,477,921 B2

MANAGING PARTICIPATION IN A TELECONFERENCE BY MONITORING FOR USE OF AN UNRELATED TERM USED BY A PARTICIPANT

BACKGROUND

The present disclosure relates to the field of computers, and specifically to the use of computers with teleconferences. Still more particularly, the present disclosure relates to managing participation in a teleconference.

Teleconferences are used for on-line education, strategy conferences, technical discussions and other corporate meetings. They provide convenient and inexpensive alternatives to classes and meetings that require people to travel to meeting locations, resulting in transportation and lodging expenses, lost work time, etc. Thus, through the use of teleconferences, people from distant locations can participate in a on-line course or discussion without ever having to leave their own class rooms, offices or homes.

BRIEF SUMMARY

In one embodiment, a computer implemented method manages participation in a teleconference. Teleconference inputs from participants of a teleconference are monitored for use of an unrelated term, which is a term that has been deemed unrelated to a topic of the teleconference. Upon determining that an errant participant is using the unrelated term in at least one of the teleconference inputs, an alert is generated to prompt the errant participant to limit future teleconference inputs to the topic of the teleconference.

In one embodiment, a computer system comprises: a central processing unit; and a memory coupled to the central processing unit, wherein the memory comprises software that, when executed, causes the central processing unit to implement: monitoring teleconference inputs from participants of a teleconference for use of an unrelated term, wherein the unrelated term is a term that has been deemed unrelated to a topic of the teleconference; determining that an errant participant is using the unrelated term in at least one of the teleconference inputs; and managing participation in the teleconference by generating an alert to prompt the errant participant to limit future teleconference inputs to the topic of the teleconference.

In one embodiment, a computer program product comprises: a computer readable storage medium having computer readable program code embodied therewith, the computer readable program code comprising: computer readable program code to monitor teleconference inputs from participants of a teleconference for use of an unrelated term, wherein the unrelated term is a term that has been deemed unrelated to a topic of the teleconference; computer readable program code to determine that an errant participant is using the unrelated term in at least one of the teleconference inputs; and computer readable program code to manage participation in the teleconference by generating an alert to prompt the errant participant to limit future teleconference inputs to the topic of the teleconference.

BRIEF DESCRIPTION OF THE SEVERAL VIEWS OF THE DRAWINGS

FIG. 5 is a high level flow chart of one or more exemplary steps taken by a computer to manage participation in a teleconference.

DETAILED DESCRIPTION

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Figure 1:
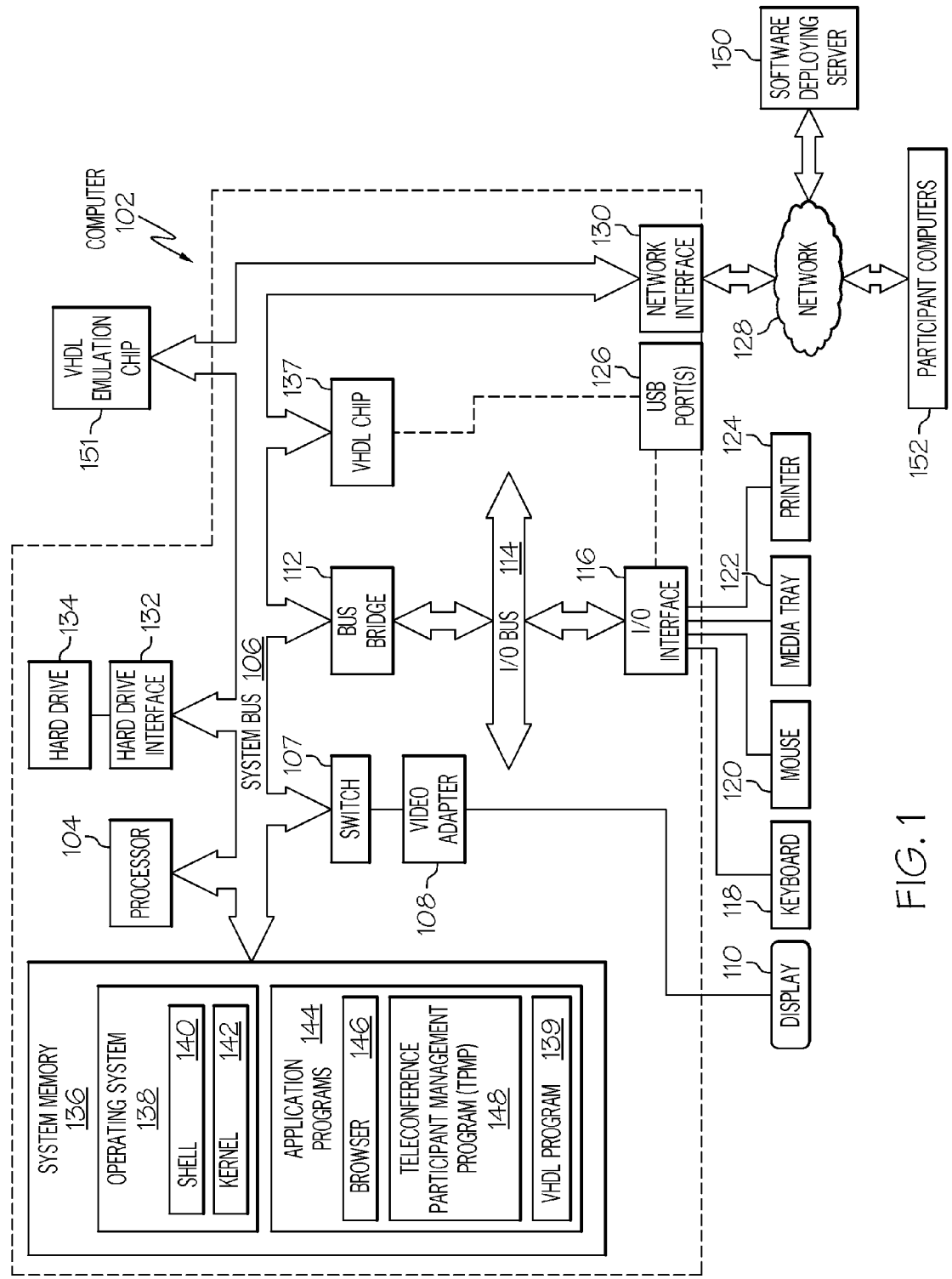
FIG. 1 depicts an exemplary computer in which the present disclosure may be implemented.

With reference now to the figures, and in particular to FIG. 1, there is depicted a block diagram of an exemplary computer 102, which may be utilized by the present disclosure. Note that some or all of the exemplary architecture, including both depicted hardware and software, shown for and within computer 102 may be utilized by software deploying server 150, and/or participant computers 152.

Computer 102 includes a processor unit 104 that is coupled to a system bus 106. Processor unit 104 may utilize one or more processors, each of which has one or more processor cores. A video adapter 108, which drives/supports a display 110, is also coupled to system bus 106. In one embodiment, a switch 107 couples the video adapter 108 to the system bus 106. Alternatively, the switch 107 may couple the video adapter 108 to the display 110. In either embodiment, the switch 107 is a switch, which may be mechanical, that allows the display 110 to be coupled to the system bus 106, and thus to be functional only upon execution of instructions (e.g., teleconference participant management program—TPMP 148 described below) that support the processes described herein.

System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and (if a VHDL chip 137 is not utilized in a manner described below), external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 and/or participant computers 152 via network 128 using a network interface 130. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present disclosure will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other described computer systems.

Application programs 144 in computer 102's system memory (as well as software deploying server 150's system memory) also include a teleconference participant management program (TPMP) 148. TPMP 148 includes code for implementing the processes described below, including those described in FIGS. 2-5. In one embodiment, computer 102 is able to download TPMP 148 from software deploying server 150, including in an on-demand basis, such that the code from TPMP 148 is not downloaded until runtime or otherwise immediately needed by computer 102. Note further that, in one embodiment of the present disclosure, software deploying server 150 performs all of the functions associated with the present disclosure (including execution of TPMP 148), thus freeing computer 102 from having to use its own internal computing resources to execute TPMP 148.

Also stored in system memory 136 is a VHDL (VHSIC hardware description language) program 139. VHDL is an exemplary design-entry language for field programmable gate arrays (FPGAs), application specific integrated circuits (ASICs), and other similar electronic devices. In one embodiment, execution of instructions from TPMP 148 causes VHDL program 139 to configure VHDL chip 137, which may be an FPGA, ASIC, etc.

In another embodiment of the present disclosure, execution of instructions from TPMP 148 results in a utilization of VHDL program 139 to program a VHDL emulation chip 151. VHDL emulation chip 151 may incorporate a similar architecture as described above for VHDL chip 137. Once TPMP 148 and VHDL program 139 program VHDL emulation chip 151, VHDL emulation chip 151 performs, as hardware, some or all functions described by one or more executions of some or all of the instructions found in TPMP 148. That is, the VHDL emulation chip 151 is a hardware emulation of some or all of the software instructions found in TPMP 148. In one embodiment, VHDL emulation chip 151 is a programmable read only memory (PROM) that, once burned in accordance with instructions from TPMP 148 and VHDL program 139, is permanently transformed into a new circuitry that performs the functions needed to perform the process described below in FIGS. 2-5.

The hardware elements depicted in computer 102 are not intended to be exhaustive, but rather are representative to highlight essential components required by the present disclosure. For instance, computer 102 may include alternate memory storage devices such as magnetic cassettes, digital versatile disks (DVDs), Bernoulli cartridges, and the like. These and other variations are intended to be within the spirit and scope of the present disclosure.

Figure 2:
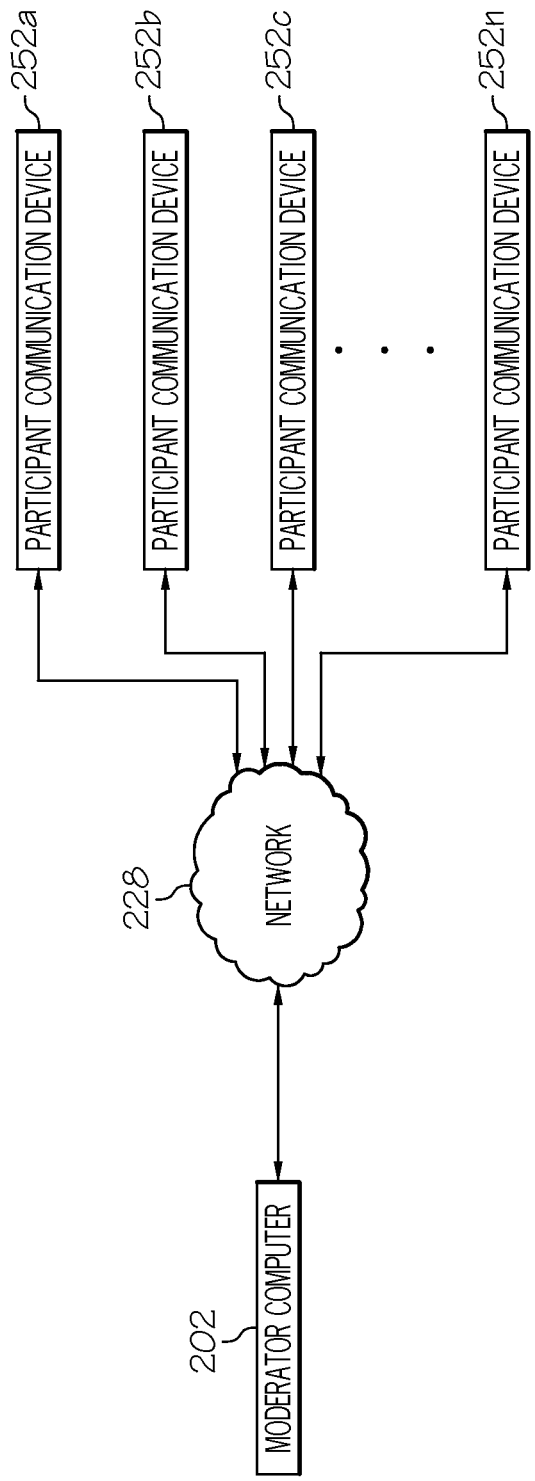
FIG. 2 illustrates an interconnection among participant communication devices and a moderator computer used in a teleconference.

With reference now to FIG. 2, an exemplary interconnection among participant communication devices 252*a-n* (where "n" is an integer) and a moderator computer 202 used in a teleconference is presented. Participant communication devices 252*a-n* may be telephones, computers (e.g., participant computers 152 shown in FIG. 1), dedicated video conferencing equipment, or any other communication devices used during a teleconference, which may be audio, video, or any combination thereof. Participant communication devices 252*a-n* are able to communication with one another, as well as a moderator computer 202 (e.g., computer 102 shown in FIG. 1) via a network 228 (e.g., network 128 shown in FIG. 1). In one embodiment, a moderator of the teleconference utilizes moderator computer 202, while in another embodiment the moderator of the teleconference may be user(s) of one or more of the participant communication devices 252a-n.

As described herein, the teleconference may be limited to, or at least focused on, a topic or group of topics. For example, assume that the teleconference is directed to a discussion about computers. In one embodiment, the present disclosure presents a method for determining if sub-topics raised and/or discussed during the teleconference are related to the main topic of computers, and to what degree. In such an example, assume further that sets of terms are pre-defined according to a relationship graph, such as graph 302 shown in FIG. 3. Additional terms can be extracted and added to graph 302 during the teleconference. Metadata from the terms (pre-defined as well as those created during the teleconference, either using voice-to-text conversions or from typed entries from participants/moderators) are used to define the relationships (relevance and distances) among the terms. For example, the main topic "Computers" is directly related to subtopics/terms such as "Processor" and "Manufacturer", but is less closely related to a specific manufacture such as "Manufacturer C". Note that "Device A", which is a subtopic of "Personal Devices" may have either two degrees ("Personal Devices" to "Device A") or three degrees ("Manufacturer" to "Manufacturer A" to "Device A") of separation from "Computers". In one embodiment, the greater degrees of separation (e.g., three in this example) are deemed more significant than the lesser degrees of separation (e.g., two in this example). Thus, "Device A" is deemed to be less relevant to "Computers" than "Device C". In another embodiment, the lesser degree of separation is deemed more significant, and thus "Device A" and "Device C" have the same degree of relevance to the main topic of "Computers".

Figure 3:
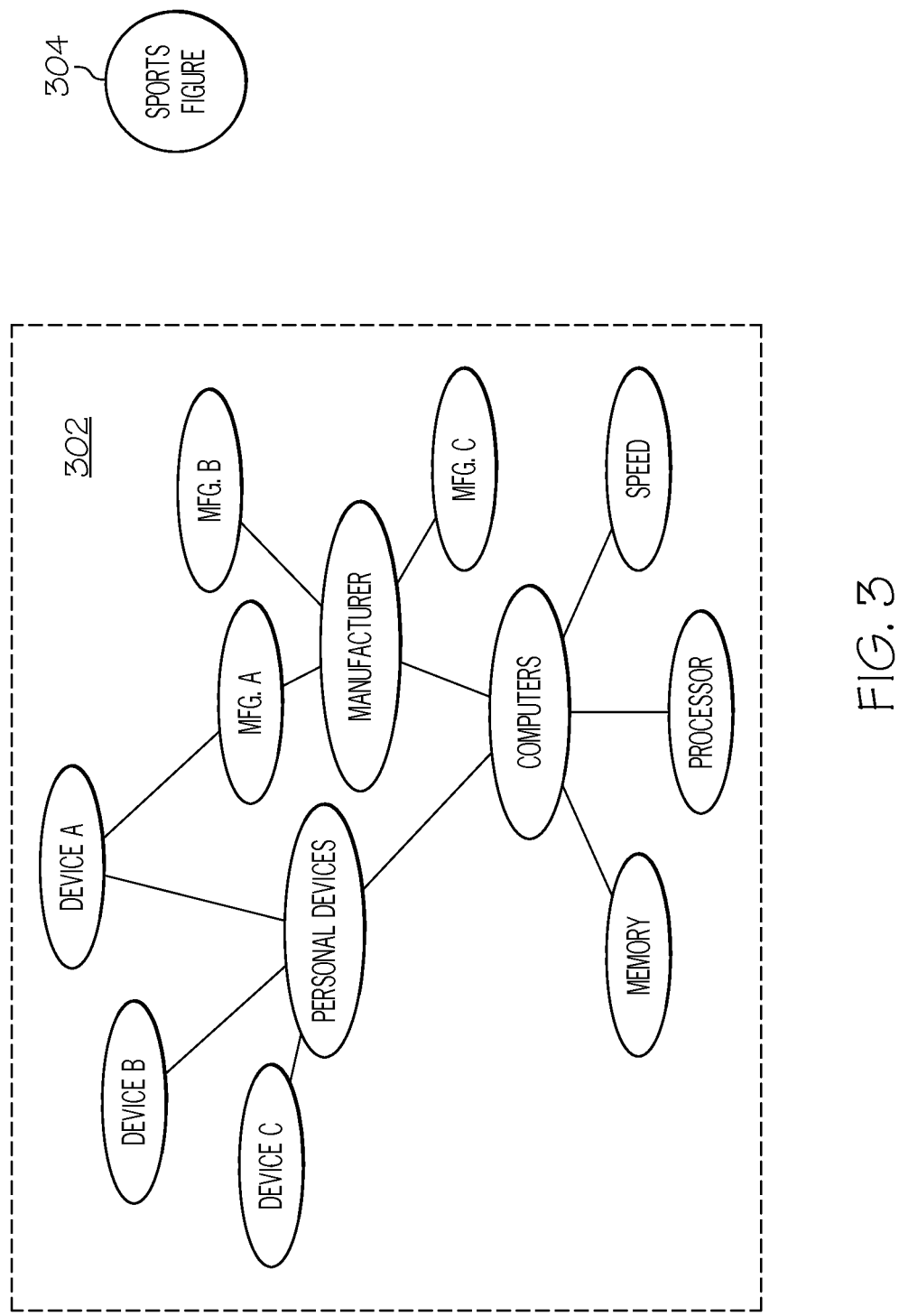
FIG. 3 depicts an exemplary relationship diagram of subtopics related to a main topic of a teleconference and a topic that is unrelated to the main topic of the teleconference.

Note in FIG. 3 that the topic/term "Sports Figure" (304) has been deemed unrelated to the main topic "Computers". That is, the metadata for the topics/term depicted in FIG. 3 reveal an ontology path which also indicates the domain relatedness. For example, Manufacturer A is in the same domain as "Computers" (e.g., /Computers/Manufacturer/MfgA), but Sports Figure is a person (e.g., /Person/Sport/Golfer), which is in a different domain from "Computers". In one embodiment "Sports Figure" is part of a predefined lexicon of topics that are unrelated to the main topic of "Computers". In one embodiment, "Sports Figure" is a topic that has been detected as part of a participant's teleconference input, which is then determined "on the fly" as being unrelated to the main topic of "Computers".

In one embodiment, graph 302 is a coherent semantic graph of related words/terms/phrases. More specifically, all nodes in the graph 302 are initially pre-defined, and then are modified, removed and/or added over time. For example, assume that "memory" is an initially defined term in the depicted node labeled "memory". Subsequently, other terms such as RAM, ROM, DRAM, EEPROM, flash drive, etc. can be appended to the node for "memory" based on their usage during the teleconference discussed herein. That is, if one of these terms is used during the teleconference, then computer logic (e.g., TPMP 148 shown in FIG. 1) will determine that the term is analogous to the term "memory", and thus the new term is added to graph 302. Similarly, TPMP 148 may initially determine from a primary lookup table or other similar database that the new term is not analogous or related to "memory". However, TPMP 148 may then look up colloquialisms used by a particular participant in the teleconference. These colloquialisms are part of a profile for that participant, which includes regional and geographic information that are used to identify regional terms and/or expressions.

However graph 302 is created and updated, in one embodiment graph 302 is used as a quick editor by a moderator of the teleconference, and/or by software logic used to identify terms that are unrelated to the main topic of the teleconference. In another embodiment, rather than create/maintain a graph 302 of related terms, a graph of unrelated terms can be generated. Thus, if a particular event is ongoing (such as the world cup), the moderator would know that discussions about this event are likely, and thus need to be monitored for. In another embodiment, a first graph for related terms and a second graph for unrelated terms can both be used in conjunction, in order to identify unrelated terms/phrases.

Figure 4:
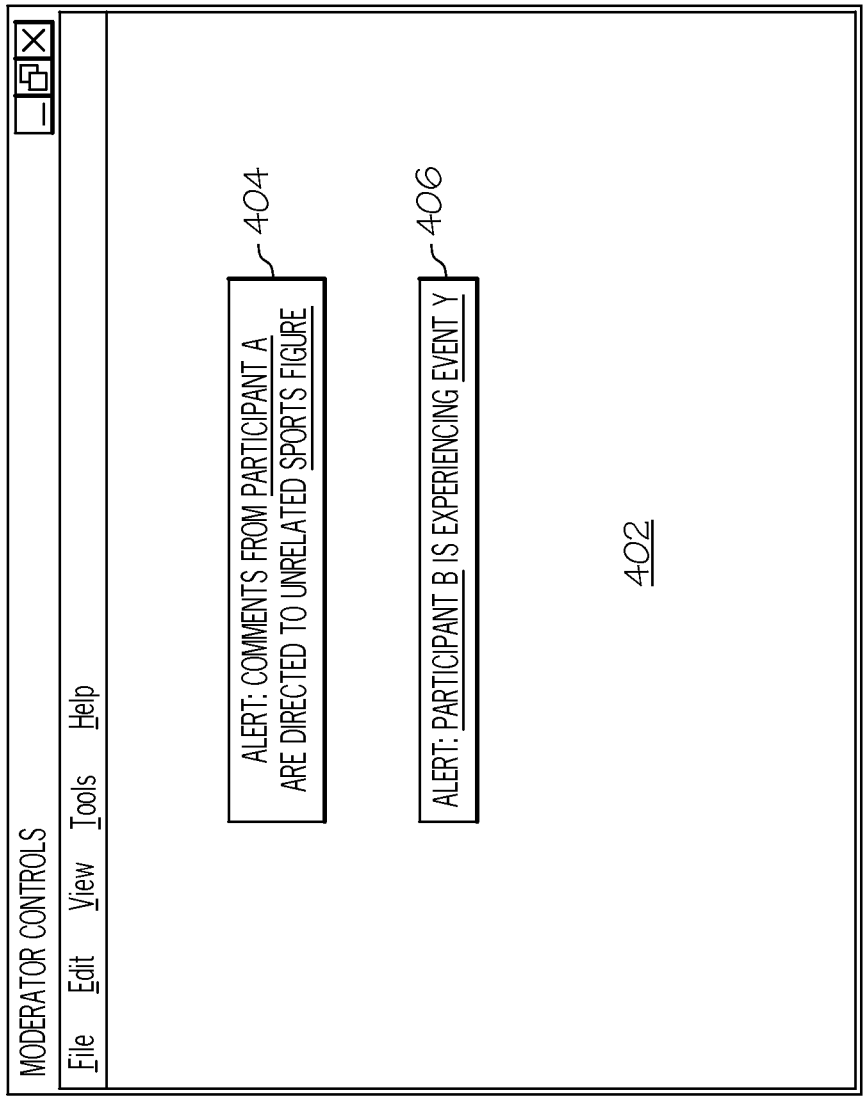
FIG. 4 illustrates an exemplary user interface that displays alerts related to the teleconference.

As depicted in user interface 402 of FIG. 4, assume that "Participant A" (i.e., a user of one of the participant communication devices 252a-n shown in FIG. 2) has spoken, typed, or otherwise entered a comment about "Sports Figure" as a teleconference input (i.e., input into the discussion being held during the teleconference about "Computers"). An alert may then be presented to a moderator in alert block 404 of FIG. 4, showing which participant in the teleconference is "off topic", and what this "off topic" element is (i.e., "Sports Figure").

Referring now to FIG. 5, a high level flow chart of one or more exemplary steps taken by a computer to manage participation in a teleconference is presented. After initiator block 502, teleconference inputs from participants of a teleconference are monitored for use of an unrelated term (block 504). The teleconference inputs may be spoken or written terms presented during discussions in the teleconference. The unrelated term is a term that has been deemed unrelated to a topic of the teleconference, either beforehand or dynamically during the teleconference. The unrelated term may be a single word, a phrase, a synonymous term (i.e., any word that has a similar meaning as a term that has been deemed unrelated to the main topic of the teleconference), etc. In one embodiment, a query is made as to whether one or more, or all of the teleconferenced participants, has used the unrelated term beyond a threshold limit (query block 506). That is, in one embodiment, a single teleconference participant exceeds a threshold value for using the unrelated term before an alert is generated. In one embodiment, multiple or all of the teleconference participants each must exceed the threshold value before the alert is generated. In one embodiment, the threshold value is a summation of the total usage of the unrelated term by some or all of the participants in the teleconference, without regard to which or how many of the teleconference participants actually use the unrelated term. If the unrelated term has been used beyond the threshold limit (which may be one or multiple usages), then an alert is generated to prompt the errant participant to limit future teleconference inputs to the topic of the teleconference, thus managing participation in the teleconference (block 508). Note that these teleconference inputs may be on-line text inputs (e.g., instant messages), voice inputs (which may be converted into text data), etc. The alert can be presented to an assigned moderator to the teleconference, and/or the alert can be presented to any or all of the teleconference participants, including the errant participant that is off topic.

As depicted in block 510 of FIG. 5, additional management of the teleconference can be achieved by receiving a physical location of a remote participant to the teleconference, receiving information about a current event at the location of the remote participant, and then displaying a message (e.g., to the teleconference moderator) describing the current event that occurred (or is occurring) at the location of the remote participant. For example, local emergency alerts, weather information, news/local events information etc. can be retrieved via on-line feeds or software services. With this information, the moderator can ease into the discussion with lighter topics, such as unusual weather, etc., in order to encourage team participation. The moderator can also be made aware of urgent local information that must be delivered to participants of specific region or area, such as extreme weather conditions, earthquakes, etc. Such information can be presented to the moderator in a window such as an emergency block 406 shown in FIG. 4. This information can then be disseminated to the affected teleconference participant (in order to provide that participant necessary information to take local emergency action), or to other participants (in order to understand the nature of the emergency, and why the affected participant is dropping off line).

In one embodiment, the alert shown in emergency block 406 (depicted in FIG. 4) can be subject to filtering. For example, assume that the alert was generated by a weather service, which issued a tornado alert for a state in which one of the participants of the teleconference is located. However, the filter (which may be part of TPMP 148 shown in FIG. 1) knows that the participant is in a city that is 50 miles from the tornado warning area. Thus, the alert would be filtered out, and the moderator and/or participant would never see the emergency block 406 on their UIs.

Continuing with FIG. 5, a participant profile about a particular teleconference participant, including one that has been deemed or will subsequently be deemed to be errant for using terms unrelated to the main topic of the teleconference, can be received (block 512). This participant profile may include any information about this teleconference participant to explain inputs/responses received from that teleconference participant. Examples of such information include, but are not limited to, vernacular used by that teleconference participant, any language barrier that may exist for that teleconference participant, etc. For example, this particular teleconference participant may use the term "Sports Figure" (shown in FIG. 3 as element 304) as vernacular for a "Processor". That is, assume that in this participant's country (or enterprise department), they call central processing units "John Smiths", after a famous sports figure having a reputation for being quick to understand the dynamics of a game. Without this participant's profile, the moderator would be told that this teleconference participant was getting "off topic" by the alert being generated. However, with this participant's profile, a determination is made (query block 514) that the term used is actually "on topic" (related to the topic of the teleconference), since "John Smith" is another term for "Processor", and thus the alert is cancelled (block 516). The process ends at terminator block 518.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the disclosure of the present application in detail and by reference to illustrative embodiments thereof, it will be apparent that modifications and variations are possible without departing from the scope of the disclosure defined in the appended claims.

What is claimed is:

1. A computer implemented method to manage participation in a teleconference, the computer implemented method comprising:

generating a hierarchical graph of terms, wherein the hierarchical graph comprises a main topic and a plurality of subtopics, wherein the main topic is directly related to a topic of a teleconference, and wherein each of the plurality of subtopics are separated from the main topic by one or more degrees of separation on the hierarchical graph;

in response to determining that a particular subtopic is more than a predetermined degree of separation from the main topic, deeming said particular subtopic as being unrelated to the topic of the teleconference;

a processor monitoring teleconference inputs from participants of a teleconference for use of an unrelated term, wherein the unrelated term is a term that has been deemed related to the particular subtopic and thus unrelated to the topic of the teleconference;

determining that an errant participant is using the unrelated term in at least one of the teleconference inputs; and managing participation in the teleconference by generating an alert to prompt the errant participant to limit future teleconference inputs to the topic of the teleconference.

2. The computer implemented method of claim 1, further comprising:

transmitting the alert to a moderator of the teleconference.

3. The computer implemented method of claim 1, further comprising:

transmitting the alert to the errant participant.

4. The computer implemented method of claim 1, wherein the teleconference inputs from the participants are on-line text inputs.

5. The computer implemented method of claim 1, wherein the teleconference inputs from the participants are voice inputs.

6. The computer implemented method of claim 1, further comprising:

setting a threshold limit for use of the unrelated term; and
generating the alert if the threshold limit is exceeded by the errant participant.

7. The computer implemented method of claim 1, further comprising:

setting a threshold limit for use of the unrelated term; and
generating the alert if the threshold limit is exceeded by a combination of all of the participants of the teleconference.

8. The computer implemented method of claim 1, further comprising:

receiving a physical location of a remote participant to the teleconference;
receiving information about a current event at the location of the remote participant; and
displaying a message describing the current event that occurred at the location of the remote participant.

9. The computer implemented method of claim 1, further comprising:

receiving a participant profile of the errant participant; and
canceling the alert upon determining, based on information from the participant profile, that the unrelated term is related to the topic of the teleconference.

10. The computer implemented method of claim 9, further comprising:

identifying a vernacular term being used by the errant participant in said at least one of the teleconference inputs, wherein the vernacular term is identified by the participant profile as having a definition that is different for the errant participant and a moderator of the teleconference, and wherein the vernacular term is related to the topic of the teleconference when used by participants that meet the participant profile of the errant participant.

11. The computer implemented method of claim 1, further comprising:

generating a graph of unrelated terms based on a current event, wherein the current event is occurring during the teleconference; and
identifying the unrelated term by locating the unrelated term on the graph of unrelated terms that are based on the current event.

12. A computer system comprising:
a central processing unit; and
a memory coupled to the central processing unit, wherein the memory comprises software that, when executed, causes the central processing unit to implement:
generating a hierarchical graph of terms, wherein the hierarchical graph comprises a main topic and a plurality of subtopics, wherein the main topic is directly related to a topic of a teleconference, and wherein each of the plurality of subtopics are separated from the main topic by one or more degrees of separation on the hierarchical graph;
in response to determining that a particular subtopic is more than a predetermined degree of separation from the main topic, deeming said particular subtopic as being unrelated to the topic of the teleconference;
monitoring teleconference inputs from participants of a teleconference for use of an unrelated term, wherein the unrelated term is a term that has been deemed related to the particular subtopic and thus unrelated to the topic of the teleconference;
determining that an errant participant is using the unrelated term in at least one of the teleconference inputs; and
managing participation in the teleconference by generating an alert to prompt the errant participant to limit future teleconference inputs to the topic of the teleconference.

13. The computer system of claim 12, wherein the teleconference inputs from the participants are voice inputs.

14. The computer system of claim 12, wherein the software, when executed, further causes the central processing unit to implement:

presenting the alert to a moderator of the teleconference.

15. The computer system of claim 12, wherein the software, when executed, further causes the central processing unit to implement:

setting a threshold limit for use of the unrelated term; and
generating the alert if the threshold limit is exceeded by the errant participant.

16. The computer system of claim 12, wherein the software, when executed, further causes the central processing unit to implement:

setting a threshold limit for use of the unrelated term; and
generating the alert if the threshold limit is exceeded by a combination of all of the participants of the teleconference.

17. The computer system of claim 12, wherein the software, when executed, further causes the central processing unit to implement:

receiving a physical location of a remote participant to the teleconference;
receiving information about a current event at the location of the remote participant; and
displaying a message describing the current event at the location of the remote participant.

18. The computer system of claim 12, wherein the software, when executed, further causes the central processing unit to implement:

receiving a participant profile of the errant participant; and
canceling the alert upon determining, based on information from the participant profile, that the unrelated term is related to the topic of the teleconference.

19. A computer program product comprising:
a non-transitory computer readable storage medium having computer readable program code embodied therewith, the computer readable program code comprising:
computer readable program code to generate a hierarchical graph of terms, wherein the hierarchical graph comprises a main topic and a plurality of subtopics, wherein the main topic is directly related to a topic of a teleconference, and wherein each of the plurality of subtopics are separated from the main topic by one or more degrees of separation on the hierarchical graph;
computer readable program code to, in response to determining that a particular subtopic is more than a predetermined degree of separation from the main topic, deem said particular subtopic as being unrelated to the topic of the teleconference;

computer readable program code to monitor teleconference inputs from participants of a teleconference for use of an unrelated term, wherein the unrelated term is a term that has been deemed related to the particular subtopic and thus unrelated to the topic of the teleconference;

computer readable program code to determine that an errant participant is using the unrelated term in at least one of the teleconference inputs; and computer readable program code to manage participation in the teleconference by generating an alert to prompt the errant participant to limit future teleconference inputs to the topic of the teleconference.

* * * * *